United States Patent Office 3,804,820
Patented Apr. 16, 1974

3,804,820
N-(SUBSTITUTED-α-PENICILLOYL)-
AMINO CARBOXYLIC ACIDS
Peter Quitt, 40 Mittlerer Rainweg, Fullinsdorf, Switzerland, and Karl Vogler, deceased, late of Riehen, Switzerland, by Heinrich Vogler, Franziska Elisabeth Vogler and Niklaus Eduard Vogler, sole heirs at law, and Alain de Weck, Marly-le-Petit, Switzerland
No Drawing. Filed Mar. 8, 1972, Ser. No. 232,977
Int. Cl. C07c 103/52; C07d 99/14, 91/44
U.S. Cl. 260—112.5               5 Claims

ABSTRACT OF THE DISCLOSURE

Penicilloic acid derivatives represented by the formula

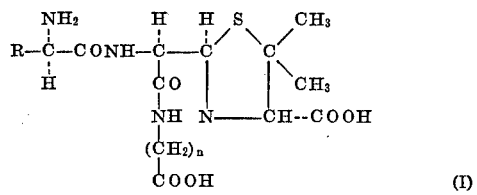

wherein $n$ is an integer from 1 to 5 inclusive and R is phenyl or 1,4-cyclohexadienyl are disclosed. These penicilloic acid derivatives are useful for the inhibition of allergic reactions which occur on administration of penicillin.

DETAILED DESCRIPTION OF THE INVENTION

The present invention is concerned with penicilloic acid derivatives represented by the formula

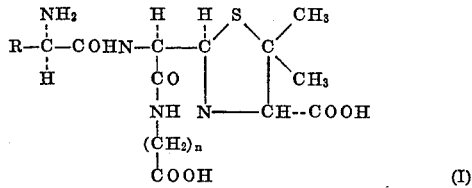

wherein $n$ is an integer from 1 to 5 inclusive and R is phenyl or 1,4-cyclohexadienyl, and salts thereof.

A preferred group of compounds represented by Formula I is obtained when $n$ is 5. Especially preferred are compounds represented by Formula I wherein $n$ is 5 and R is phenyl, and salts thereof.

As indicated above, the compounds represented by Formula I can also exist as salts, most preferably as pharmaceutically acceptable salts. Examples of preferred salts include alkali metal and alkaline earth metal salts, i.e., sodium, potassium, calcium and the like. In addition, compounds represented by Formula I can form internal salts, wherein the salt formation takes place between the amino and carboxy groups.

The compounds of the present invention represented by Formula I are prepared by reacting a compound represented by the formula

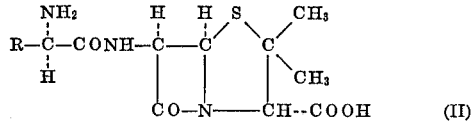

wherein R is as above, with an amino carboxylic acid represented by the formula $$H_2N\text{—}(CH_2)_n\text{—}COOH \qquad (III)$$

wherein $n$ is as above, and, if desired, converting the reaction product into a salt by procedures well known in the art.

In the preparation of a compound represented by Formula I it is preferred to employ as a starting material the compound represented by Formula II wherein R represents a phenyl group and a compound represented by Formula III wherein $n$ is 5. The reaction of the compounds represented by Formulas II and III is conveniently carried out in an aqueous/alkaline medium. The reaction temperature is preferably in a range of from about 5° C. to about 30° C.

The compounds represented by Formula I are useful in inhibiting allergic reactions which occur on the administration of penicillins.

Thus, in vitro, the precipitation of antipenicilloyl antibodies, especially antiampicilloyl antibodies (obtained from rabbit and guinea pig sera) can be inhibited means of 6 - (-α-aminobenzyl-α-penicilloylamino)-caproic acid. Furthermore, it was found that the aforesaid penicilloic acid derivatives inhibited the haemagglutination by ampicilloyl antigens erythrocytes preincubated with antipenicilloyl antibodies, especially antiampicilloy antibodies. The contraction of guinea pig ileum passively sensitized by means of antiampicilloyl-rabbit-gamma-globulin (Schultz-Dale experiment) could likewise be inhibited. In vivo, penicillin-allergic reactions such as, for example, the passive skin anaphylaxis of the guinea pig as well as the urticarial skin reaction of ampicillin-allergic persons can be inhibited by 6-(α-aminobenzyl-α-penicilloyl amino)-caproic acid. Similar effects were achieved with 6-[α-amino-(1,4-cyclohexadienyl)-methyl-α-penicilloylamino]caproic acid.

The compounds represented by Formula I and their pharmaceutically acceptable salts are useful as inhibitors of allergic reactions which may occur on the administration of penicillins. These compounds can be used in the form of conventional pharmaceutical preparations; for example, the aforesaid compounds can be mixed with conventional organic or inorganic, inert pharmaceutical carrier materials suitable for parenteral or internal administration. They can be administered in conventional pharmaceutical forms, preferably parenteral forms, for example, solutions, suspensions and emulsions. Examples of conventional pharmaceutical carrier materials which may be utilized in such forms include, for example, water for injection, vegetable oils, polyalkylene glycols and the like. Such preparations can be subjected to conventional pharmaceutical expedients such as sterilization and can contain conventional pharmaceutical adjuncts such as preservatives, stabilizing agents, wetting agents, emulsifying agents, salts for the adjustments of osmotic pressure, buffers and the like. The compositions can also contain other therapeutically active materials.

A suitable pharmaceutical dosage unit for oral therapy can contain from about 200 mg. to 600 mg. of the aforesaid compounds represented by Formula I or their pharmaceutically acceptable salts. Such therapeutic doses may be administered in the typical clinical situation from 2 to 4 times daily. Suitable parenteral regimens in warm-blooded mammals comprise from about 4 mg./kg. per day to about 12 mg./kg. per day. However, for any particular subject the specific dosage regimen should be adjusted according to individual needs and the desires of the clinician. It is to be understood that the dosage set forth herein are exemplary only and do not to any extent limit the scope or practice of this invention.

The following examples further illustrate the invention. All temperatures are stated in degrees centigrade.

Example 1

A solution of 26.0 grams of 6-amino caproic acid in 345 ml. of 1 N sodium hydroxide were treated over a period of 10 minutes at 10° with 58.0 grams of α-aminobenzyl penicillin trihydrate (ampicillin) and the resulting mixture stirred for an additional 20 minutes. The resulting solution was then added to 1 kg. of a suitable ion exchange resin (Amberlite IR 120 Rohm & Haas Co.) which was then eluted with water. The aqueous solution thus produced was lyophilized and the residue dissolved in alcohol and precipitated with ethyl acetate. The precipitate was reacted in a methanol solution with 2 N sodium ethylcaproate and the product precipitated with ether. From the methanol/ether there was obtained, after treatment with animal charcoal, 6 - (-α-aminobenzyl-α-penicilloylamino)-caproic acid sodium, M.P. 157°–160°; $[\alpha]_D^{25}=$ +30.3° (c.=1 in water).

Example 2

In a manner entirely analogous to that described in Example 1 utilizing α-amino-(1,4-cyclohexadienyl)methylpenicillin and 6-amino caproic acid there was obtained 6-[α-amino-(1,4-cyclohexadienyl)methyl - α - penicilloylamino]-caproic acid sodium.

Example 3

Capsules were prepared for oral administration from the following composition:

| Ingredient: | Amount per Capsule, mg. |
|---|---|
| 6 - (α-aminobenzyl - α - penicilloylamino)-caproic acid sodium | 200 |
| Lactose | 70 |
| Magnesium stearate | 3 |
| Talcum | 17 |
| Total | 290 |

The active substance was homogeneously mixed with the lactose and magnesium stearate, passed through a suitable fitting machine and, after admixture with the talcum, filled into gelatin capsules.

Example 4

Dry ampoules containing 100 mg. of 6-(α-aminobenzyl-α-penicilloylamino)-caproic acid sodium salt were prepared by conventional techniques. Prior to use, 1–5 ml. of water for injection are added.

We claim:

1. A compound selected from the group consisting of those compounds represented by the formula

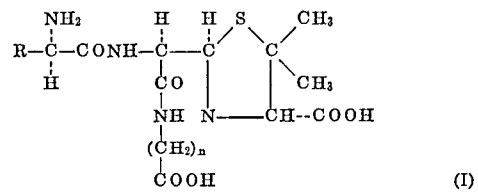

(I)

wherein n is an integer from 1 to 5 inclusive and R is phenyl or 1,4-cyclohexadienyl, and pharmaceutically acceptable salts thereof.

2. A compound in accordance with claim 1 wherein n is 5 and R is phenyl, i.e., the compound 6-(α-aminobenzyl-α-penicilloylamino)-caproic acid.

3. A compound in acccordance with claim 2 wherein pharmaceutically acceptable salts is the sodium salt.

4. A compound in accordance with claim 1 wherein n is 5 and R is the 1,4-cyclohexadienyl group, i.e., the compound 6-[α-amino-(1,4-cyclohexadienyl)methyl - α - penicilloylamino]-caproic acid.

5. A compound in accordance with claim 4 wherein said pharmaceutically acceptable salt is the sodium salt.

References Cited

UNITED STATES PATENTS

| 3,325,477 | 6/1967 | Fosker et al. | 260—112.5 |
| 3,308,023 | 3/1967 | Russell | 260—239.1 |
| 3,278,525 | 10/1966 | Johnson et al. | 260—239.1 |
| 3,268,518 | 8/1966 | Grant et al. | 260—239.1 |

OTHER REFERENCES

Schneider et al., Biochim. Biophys. Acta, 168, 27 (1968).

Mozingo et al., "The Chemistry of Penicillin," H. T. Clarke, J. R. Johnson, R. Robinson, eds., Princeton U. Press, Princeton, N.J. (1949), pp. 554–5.

ELBERT L. ROBERTS, Primary Examiner

R. J. SUYAT, Assistant Examiner

U.S. Cl. X.R.

260—239.1, 306.7; 424—177

UNITED STATES PATENT OFFICE
CERTIFICATE OF CORRECTION

PATENT NO. : 3,804,820
DATED : April 16, 1974
INVENTOR(S) : Quitt, Vogler and de Weck It is certified that error appears in the above-identified patent and that said Letters Patent are hereby corrected as shown below:

Column 1 line # 9 insert claims priority on December 5, 1973 of Swiss application No. 3558/71 filed March 11, 1971.

Signed and sealed this 24th day of June 1975.

(SEAL)
Attest:

RUTH C. MASON
Attesting Officer

C. MARSHALL DANN
Commissioner of Patents
and Trademarks